United States Patent
Yi et al.

(10) Patent No.: US 10,243,633 B2
(45) Date of Patent: Mar. 26, 2019

(54) METHOD AND APPARATUS FOR SELECTING ANTENNA FOR DUAL CONNECTIVITY IN WIRELESS COMMUNICATION SYSTEM

(71) Applicant: LG ELECTRONICS INC., Seoul (KR)

(72) Inventors: Yunjung Yi, Seoul (KR); Joonkui Ahn, Seoul (KR)

(73) Assignee: LG ELECTRONICS INC., Seoul (KR)

(*) Notice: Subject to any disclaimer, the term of this patent is extended or adjusted under 35 U.S.C. 154(b) by 133 days.

(21) Appl. No.: 15/507,213

(22) PCT Filed: Aug. 31, 2015

(86) PCT No.: PCT/KR2015/009134
§ 371 (c)(1),
(2) Date: Feb. 27, 2017

(87) PCT Pub. No.: WO2016/032306
PCT Pub. Date: Mar. 3, 2016

(65) Prior Publication Data
US 2017/0288752 A1     Oct. 5, 2017

Related U.S. Application Data

(60) Provisional application No. 62/043,426, filed on Aug. 29, 2014.

(51) Int. Cl.
*H04W 4/00* (2018.01)
*H04B 7/06* (2006.01)
(Continued)

(52) U.S. Cl.
CPC .......... *H04B 7/0608* (2013.01); *H04B 7/026* (2013.01); *H04B 7/0404* (2013.01);
(Continued)

(58) Field of Classification Search
CPC .... H04B 7/0608; H04B 7/0404; H04B 7/026; H04W 76/15
(Continued)

(56) References Cited

U.S. PATENT DOCUMENTS

| 2011/0176593 A1 | 7/2011 | Hultell et al. |
| 2012/0213154 A1* | 8/2012 | Gaal ............... H04B 7/0608 370/328 |

(Continued)

FOREIGN PATENT DOCUMENTS

| WO | 2014077758 | 5/2014 | |
| WO | 2014/109685 | 7/2014 | |
| WO | WO-2014109685 A1 * | 7/2014 | ........ H04W 72/1268 |

OTHER PUBLICATIONS

Huawei et al., 3GPP TSG RAN WG1 Meeting #78, R1-142834, "Details of reusing dual connectivity for PUCCH on SCell with CA," Dresden, Germany, Aug. 18-22, 2014.
(Continued)

*Primary Examiner* — Thai D Hoang
(74) *Attorney, Agent, or Firm* — Lee Hong Degerman Kang Waimey

(57) ABSTRACT

A method and apparatus for configuring UE transmit antenna selection in a wireless communication system is provided. A user equipment (UE) receiving a configuration of UE transmit antenna selection from a network, and determines whether to apply the configuration of UE transmit antenna selection according to a configuration of dual connectivity. When the configuration of dual connectivity is not received from the network, it is determined to apply the configuration UE transmit antenna selection.

4 Claims, 5 Drawing Sheets

(51) Int. Cl.
*H04W 76/15* (2018.01)
*H04B 7/026* (2017.01)
*H04B 7/0404* (2017.01)
*H04W 8/22* (2009.01)
*H04W 76/10* (2018.01)
*H04W 36/28* (2009.01)
*H04W 36/00* (2009.01)

(52) U.S. Cl.
CPC .............. *H04W 76/15* (2018.02); *H04W 8/22* (2013.01); *H04W 36/0069* (2018.08); *H04W 36/28* (2013.01); *H04W 76/10* (2018.02)

(58) Field of Classification Search
USPC .................. 370/255, 328–330, 335–348; 455/446–449, 161.1–168.1
See application file for complete search history.

(56) References Cited

U.S. PATENT DOCUMENTS

| | | |
|---|---|---|
| 2014/0192740 A1 | 7/2014 | Ekpenyong et al. |
| 2014/0192775 A1* | 7/2014 | Li .................... H04W 36/0072 370/331 |
| 2014/0241281 A1 | 8/2014 | Wu |
| 2016/0242182 A1* | 8/2016 | Chen ...................... H04B 7/04 |
| 2017/0288752 A1* | 10/2017 | Yi ....................... H04B 7/0608 |
| 2018/0167118 A1* | 6/2018 | Kakishima ............ H04W 16/32 |

OTHER PUBLICATIONS

European Patent Office Application Serial No. 15835230.2, Search Report dated Mar. 16, 2018, 11 pages.

* cited by examiner

[Fig. 1]
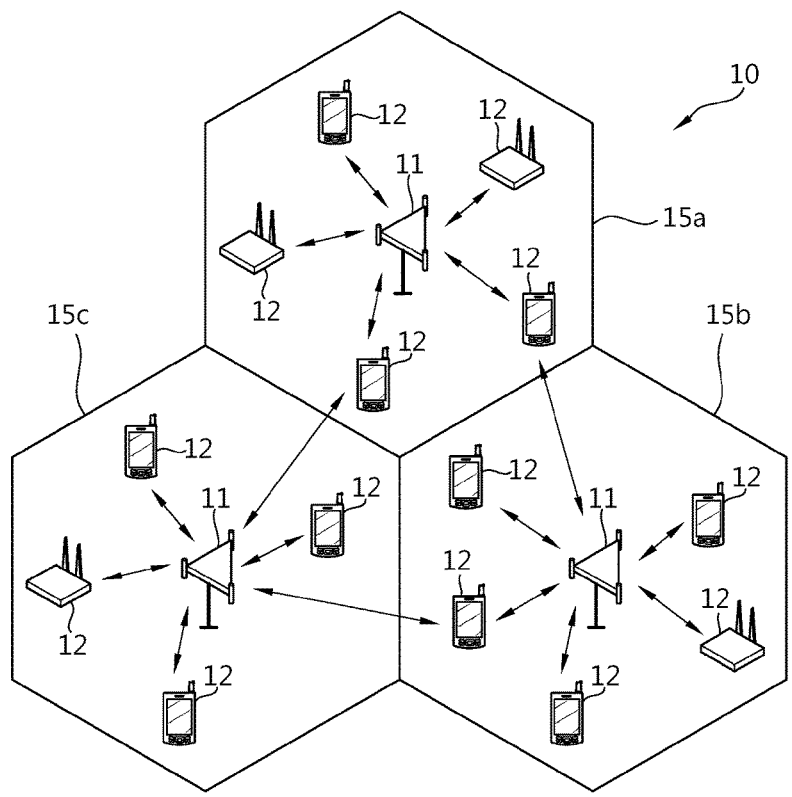
[Fig. 2]
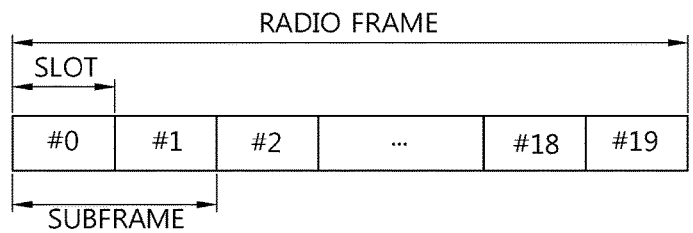

[Fig. 3]
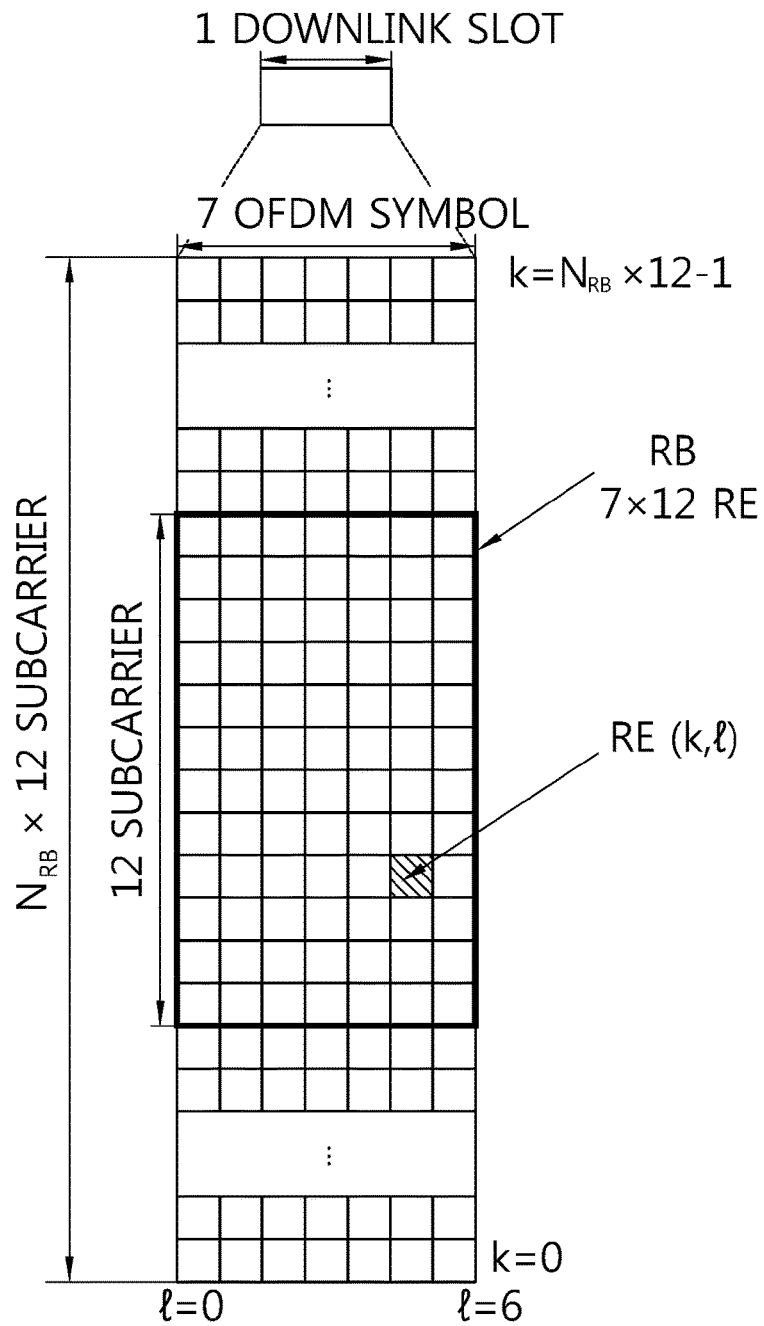

[Fig. 4]
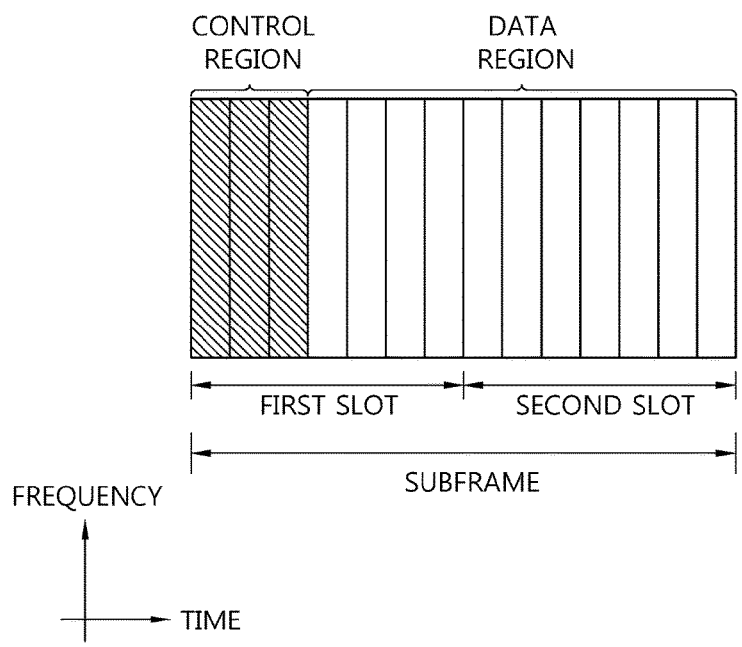

[Fig. 5]
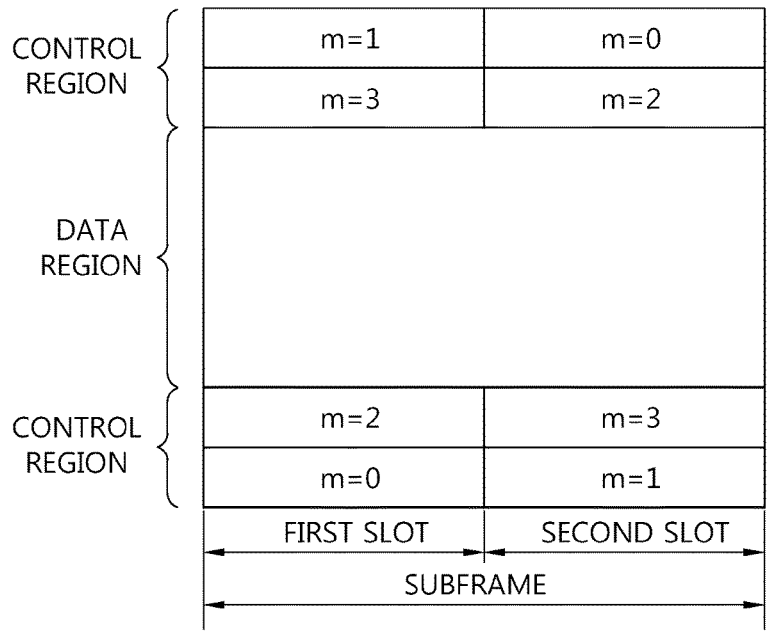
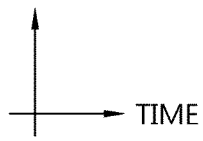
[Fig. 6]
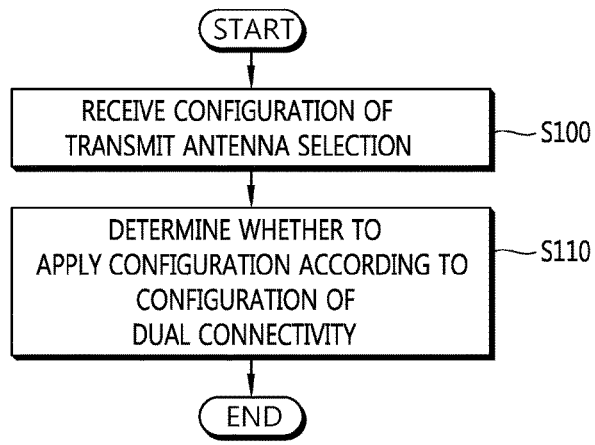

[Fig. 7]
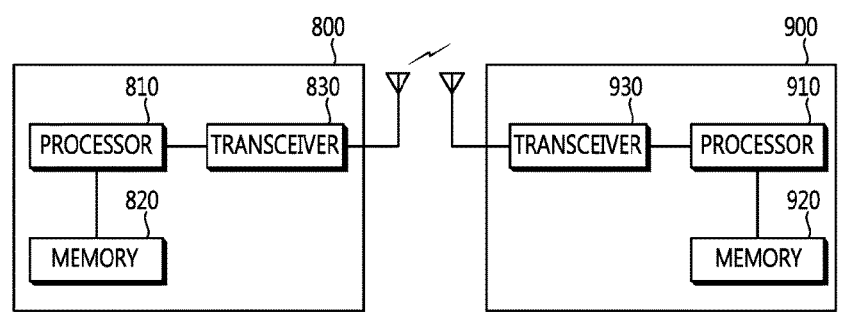

METHOD AND APPARATUS FOR SELECTING ANTENNA FOR DUAL CONNECTIVITY IN WIRELESS COMMUNICATION SYSTEM

CROSS-REFERENCE TO RELATED APPLICATIONS

This application is the National Stage filing under 35 U.S.C. 371 of International Application No. PCT/KR2015/009134, filed on Aug. 31, 2015, which claims the benefit of U.S. Provisional Application No. 62/043,426, filed on Aug. 29, 2014, the contents of which are all hereby incorporated by reference herein in their entirety.

BACKGROUND OF THE INVENTION

Field of the Invention

The present invention relates to wireless communications, and more particularly, to a method and apparatus for selecting antenna for dual connectivity in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Small cells using low power nodes are considered promising to cope with mobile traffic explosion, especially for hotspot deployments in indoor and outdoor scenarios. A low-power node generally means a node whose transmission power is lower than macro node and base station (BS) classes, for example pico and femto evolved NodeB (eNB) are both applicable. Small cell enhancements for evolved UMTS terrestrial radio access (E-UTRA) and evolved UMTS terrestrial radio access network (E-UTRAN) will focus on additional functionalities for enhanced performance in hotspot areas for indoor and outdoor using low power nodes.

One of potential solutions for small cell enhancement, dual connectivity (DC) has been discussed. Dual connectivity is used to refer to operation where a given user equipment (UE) consumes radio resources provided by at least two different network points connected with non-ideal backhaul. Furthermore, each eNB involved in dual connectivity for a UE may assume different roles. Those roles do not necessarily depend on the eNB's power class and can vary among UEs.

UE transmit antenna selection is a feature that enable UE to select between antenna port 0 and 1 when it support multiple transmission antennas. When dual connectivity can be configured, how to configure UE transmit antenna selection may be a problem.

SUMMARY OF THE INVENTION

The present invention provides a method and apparatus for selecting antenna for dual connectivity in a wireless communication system. The present invention provides a method and apparatus for antenna selection mechanism in dual connectivity scenario where each evolved NodeB (eNB) may not be able to coordinate the antenna selection in real time. The present invention provides a method and apparatus for determining whether to apply a configuration of transmit antenna selection according to a configuration of dual connectivity.

In an aspect, a method for configuring, by a user equipment (UE), UE transmit antenna selection in a wireless communication system is provided. The method includes receiving a configuration of UE transmit antenna selection from a network, and determining whether to apply the configuration of UE transmit antenna selection according to a configuration of dual connectivity.

In another aspect, a user equipment (UE) includes a memory, a transceiver, and a processor coupled to the memory and the transceiver, and configured to receive a configuration of UE transmit antenna selection from a network, and determine whether to apply the configuration of UE transmit antenna selection according to a configuration of dual connectivity.

The relationship between a configuration of dual connectivity and a configuration of UE transmit antenna selection can be clearly defined.

BRIEF DESCRIPTION OF THE DRAWINGS

FIG. 1 shows a wireless communication system.
FIG. 2 shows structure of a radio frame of 3GPP LTE.
FIG. 3 shows a resource grid for one downlink slot.
FIG. 4 shows structure of a downlink subframe.
FIG. 5 shows structure of an uplink subframe.
FIG. 6 shows an example of a method for configuring UE transmit antenna selection according to an embodiment of the present invention.
FIG. 7 shows a wireless communication system to implement an embodiment of the present invention.

DESCRIPTION OF EXEMPLARY EMBODIMENTS

Techniques, apparatus and systems described herein may be used in various wireless access technologies such as code division multiple access (CDMA), frequency division multiple access (FDMA), time division multiple access (TDMA), orthogonal frequency division multiple access (OFDMA), single carrier frequency division multiple access (SC-FDMA), etc. The CDMA may be implemented with a radio technology such as universal terrestrial radio access (UTRA) or CDMA2000. The TDMA may be implemented with a radio technology such as global system for mobile communications (GSM)/general packet radio service (GPRS)/enhanced data rates for GSM evolution (EDGE). The OFDMA may be implemented with a radio technology such as institute of electrical and electronics engineers (IEEE) 802.11 (Wi-Fi), IEEE 802.16 (WiMAX), IEEE 802-20, evolved-UTRA (E-UTRA) etc. The UTRA is a part of a universal mobile telecommunication system (UMTS). 3rd generation partnership project (3GPP) long term evolution (LTE) is a part of an evolved-UMTS (E-UMTS) using the E-UTRA. The 3GPP LTE employs the OFDMA in downlink (DL) and employs the SC-FDMA in uplink (UL). LTE-advance (LTE-A) is an evolution of the 3GPP LTE. For clarity, this application focuses on the 3GPP LTE/LTE-A. However, technical features of the present invention are not limited thereto.

FIG. 1 shows a wireless communication system. The wireless communication system 10 includes at least one evolved NodeB (eNB) 11. Respective eNBs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as mobile station (MS), mobile terminal (MT), user terminal (UT), subscriber station (SS), wireless device, personal digital assistant (PDA), wireless modem, handheld device. The eNB 11 generally refers to a fixed station that communicates with the UE 12 and may be called by other names such as base station (BS), base transceiver system (BTS), access point (AP), etc.

In general, a UE belongs to one cell, and the cell to which a UE belongs is called a serving cell. An eNB providing a communication service to the serving cell is called a serving eNB. The wireless communication system is a cellular system, so a different cell adjacent to the serving cell exists. The different cell adjacent to the serving cell is called a neighbor cell. An eNB providing a communication service to the neighbor cell is called a neighbor eNB. The serving cell and the neighbor cell are relatively determined based on a UE.

This technique can be used for DL or UL. In general, DL refers to communication from the eNB 11 to the UE 12, and UL refers to communication from the UE 12 to the eNB 11. In DL, a transmitter may be part of the eNB 11 and a receiver may be part of the UE 12. In UL, a transmitter may be part of the UE 12 and a receiver may be part of the eNB 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

FIG. 2 shows structure of a radio frame of 3GPP LTE. Referring to FIG. 2, a radio frame includes 10 subframes. A subframe includes two slots in time domain. A time for transmitting one subframe is defined as a transmission time interval (TTI). For example, one subframe may have a length of 1 ms, and one slot may have a length of 0.5 ms. One slot includes a plurality of orthogonal frequency division multiplexing (OFDM) symbols in time domain. Since the 3GPP LTE uses the OFDMA in the DL, the OFDM symbol is for representing one symbol period. The OFDM symbols may be called by other names depending on a multiple-access scheme. For example, when SC-FDMA is in use as a UL multi-access scheme, the OFDM symbols may be called SC-FDMA symbols. A resource block (RB) is a resource allocation unit, and includes a plurality of contiguous subcarriers in one slot. The structure of the radio frame is shown for exemplary purposes only. Thus, the number of subframes included in the radio frame or the number of slots included in the subframe or the number of OFDM symbols included in the slot may be modified in various manners.

The wireless communication system may be divided into a frequency division duplex (FDD) scheme and a time division duplex (TDD) scheme. According to the FDD scheme, UL transmission and DL transmission are made at different frequency bands. According to the TDD scheme, UL transmission and DL transmission are made during different periods of time at the same frequency band. A channel response of the TDD scheme is substantially reciprocal. This means that a DL channel response and a UL channel response are almost the same in a given frequency band. Thus, the TDD-based wireless communication system is advantageous in that the DL channel response can be obtained from the UL channel response. In the TDD scheme, the entire frequency band is time-divided for UL and DL transmissions, so a DL transmission by the eNB and a UL transmission by the UE cannot be simultaneously performed. In a TDD system in which a UL transmission and a DL transmission are discriminated in units of subframes, the UL transmission and the DL transmission are performed in different subframes.

FIG. 3 shows a resource grid for one downlink slot. Referring to FIG. 3, a DL slot includes a plurality of OFDM symbols in time domain. It is described herein that one DL slot includes 7 OFDM symbols, and one RB includes 12 subcarriers in frequency domain as an example. However, the present invention is not limited thereto. Each element on the resource grid is referred to as a resource element (RE). One RB includes 12×7 resource elements. The number $N^{DL}$ of RBs included in the DL slot depends on a DL transmit bandwidth. The structure of a UL slot may be same as that of the DL slot. The number of OFDM symbols and the number of subcarriers may vary depending on the length of a CP, frequency spacing, etc. For example, in case of a normal cyclic prefix (CP), the number of OFDM symbols is 7, and in case of an extended CP, the number of OFDM symbols is 6. One of 128, 256, 512, 1024, 1536, and 2048 may be selectively used as the number of subcarriers in one OFDM symbol.

FIG. 4 shows structure of a downlink subframe. Referring to FIG. 4, a maximum of three OFDM symbols located in a front portion of a first slot within a subframe correspond to a control region to be assigned with a control channel. The remaining OFDM symbols correspond to a data region to be assigned with a physical downlink shared chancel (PDSCH). Examples of DL control channels used in the 3GPP LTE includes a physical control format indicator channel (PCFICH), a physical downlink control channel (PDCCH), a physical hybrid automatic repeat request (HARQ) indicator channel (PHICH), etc. The PCFICH is transmitted at a first OFDM symbol of a subframe and carries information regarding the number of OFDM symbols used for transmission of control channels within the subframe. The PHICH is a response of UL transmission and carries a HARQ acknowledgment (ACK)/non-acknowledgment (NACK) signal. Control information transmitted through the PDCCH is referred to as downlink control information (DCI). The DCI includes UL or DL scheduling information or includes a UL transmit (Tx) power control command for arbitrary UE groups.

The PDCCH may carry a transport format and a resource allocation of a downlink shared channel (DL-SCH), resource allocation information of an uplink shared channel (UL-SCH), paging information on a paging channel (PCH), system information on the DL-SCH, a resource allocation of an upper-layer control message such as a random access response transmitted on the PDSCH, a set of Tx power control commands on individual UEs within an arbitrary UE group, a Tx power control command, activation of a voice over IP (VoIP), etc. A plurality of PDCCHs can be transmitted within a control region. The UE can monitor the plurality of PDCCHs. The PDCCH is transmitted on an aggregation of one or several consecutive control channel elements (CCEs). The CCE is a logical allocation unit used to provide the PDCCH with a coding rate based on a state of a radio channel. The CCE corresponds to a plurality of resource element groups.

A format of the PDCCH and the number of bits of the available PDCCH are determined according to a correlation between the number of CCEs and the coding rate provided by the CCEs. The eNB determines a PDCCH format according to a DCI to be transmitted to the UE, and attaches a cyclic redundancy check (CRC) to control information. The CRC is scrambled with a unique identifier (referred to as a radio network temporary identifier (RNTI)) according to an owner or usage of the PDCCH. If the PDCCH is for a specific UE, a unique identifier (e.g., cell-RNTI (C-RNTI)) of the UE may be scrambled to the CRC. Alternatively, if the PDCCH is for a paging message, a paging indicator identifier (e.g., paging-RNTI (P-RNTI)) may be scrambled to the CRC. If the PDCCH is for system information (more specifically, a system information block (SIB) to be described below), a system information identifier and a system information RNTI (SI-RNTI) may be scrambled to the CRC. To indicate a random access response that is a response for transmission of a random access preamble of the UE, a random access-RNTI (RA-RNTI) may be scrambled to the CRC.

FIG. 5 shows structure of an uplink subframe. Referring to FIG. 5, a UL subframe can be divided in a frequency domain into a control region and a data region. The control region is allocated with a physical uplink control channel (PUCCH) for carrying UL control information. The data region is allocated with a physical uplink shared channel (PUSCH) for carrying user data. When indicated by a higher layer, the UE may support a simultaneous transmission of the PUSCH and the PUCCH. The PUCCH for one UE is allocated to an RB pair in a subframe. RBs belonging to the RB pair occupy different subcarriers in respective two slots. This is called that the RB pair allocated to the PUCCH is frequency-hopped in a slot boundary. This is said that the pair of RBs allocated to the PUCCH is frequency-hopped at the slot boundary. The UE can obtain a frequency diversity gain by transmitting UL control information through different subcarriers according to time.

UL control information transmitted on the PUCCH may include a HARQ ACK/NACK, a channel quality indicator (CQI) indicating the state of a DL channel, a scheduling request (SR), and the like. The PUSCH is mapped to a UL-SCH, a transport channel. UL data transmitted on the PUSCH may be a transport block, a data block for the UL-SCH transmitted during the TTI. The transport block may be user information. Or, the UL data may be multiplexed data. The multiplexed data may be data obtained by multiplexing the transport block for the UL-SCH and control information. For example, control information multiplexed to data may include a CQI, a precoding matrix indicator (PMI), an HARQ, a rank indicator (RI), or the like. Or the UL data may include only control information.

Dual connectivity (DC) is described. Dual connectivity is an operation where a given UE consumes radio resources provided by at least two different network points (master eNB (MeNB) and secondary eNB (SeNB)) connected with non-ideal backhaul while in RRC_CONNECTED. That is, the UE receives two kind of services by the dual connectivity. One of the services is received from the MeNB directly. The MeNB is an eNB which terminates at least S1-MME and therefore act as mobility anchor towards the core network (CN) in dual connectivity. The other service is received from the SeNB. The SeNB is an eNB which provides additional radio resources for the UE, which is not the MeNB, in dual connectivity. Further, the service may be moved between the macro eNB and SeNB depending on the UE's requirement or load status of the eNBs.

For dual connectivity, the UE may configured with two cell groups (CGs). A CG may only include cells that are associated to the same eNB and those cells are synchronized at the eNB level similar as for carrier aggregation. A master cell group (MCG) refers the group of the serving cells associated with the MeNB, comprising of the primary cell (PCell) and optionally one or more secondary cells (SCells). A secondary cell group (SCG) refers the group of the serving cells associated with the SeNB, comprising of primary SCell (PSCell) and optionally one or more SCells.

UE transmit antenna selection is described. UE transmit antenna selection is configured by higher layers via parameter ue-TransmitAntennaSelection. A UE configured with transmit antenna selection for a serving cell is not expected to be configured with more than one antenna port for any UL physical channel or signal for any configured serving cell, or be configured with trigger type 1 sounding reference signal (SRS) transmission on any configured serving cell, or be configured with simultaneous PUCCH and PUSCH transmission, or be configured with demodulation reference signal for PUSCH with orthogonal cover code (OCC) for any configured serving cell, or receive DCI Format 0 indicating UL resource allocation type 1 for any serving cell.

If UE transmit antenna selection is disabled or not supported by the UE, the UE shall transmit from UE port 0. If closed-loop UE transmit antenna selection is enabled by higher layers the UE shall perform transmit antenna selection for PUSCH in response to the most recent command received via DCI Format 0. If a UE is configured with more than one serving cell, the UE may assume the same transmit antenna port value is indicated in each PDCCH/enhanced PDCCH (EPDCCH) with DCI format 0 in a given subframe. If open-loop UE transmit antenna selection is enabled by higher layers, the transmit antenna for PUSCH/SRS to be selected by the UE is not specified.

UE transmit antenna selection used in carrier aggregation (CA) is specified based on the assumption that carriers are configured by one eNB where dependent scheduling and real-time coordination between carriers are available. However, when dual connectivity is configured to a UE which allows two eNBs configure independent carriers, the use of UE transmit antenna selection may become challenging depending on UE radio frequency (RF) capability. If a UE has independent RF capability to support UL transmission to each eNB, individual configuration of UE transmit antenna selection is feasible. For example, when dual connectivity is configured for inter-band carriers, individual RF per band may be expected. In that case, separate configuration of UE transmit antenna selection may be supported.

To determine whether a UE can support independent UE transmit antenna selection or not may be done in different ways. The first approach is that a UE may indicate the capability of independent UE transmit antenna selection per band-combination and/or per band. For the indicated band-combination or band, the network may assume that independent UE transmit antenna selection may be achieved. The second approach is based on the band combination. It may be assumed that a UE can support independent UE transmit antenna selection configuration for inter-band combinations, whereas a UE cannot support independent UE transmit antenna selection for intra-band CA or DC combinations. If the second approach is used, even in inter-band combination, a UE may not be able to support independent UE transmit antenna selection. Similarly, for intra-band combination, depending on UE capability, it may still support independent UE transmit antenna selection.

Hereinafter, a method for configuring UE transmit antenna selection for dual connectivity according to an embodiment of the present invention is described. Depending on capability whether a UE can perform independent UE transmit antenna selection and whether the network knows the UE capability, four cases may be considered as follows.

(1) A UE is always able to support independent UE transmit antenna selection and the network knows the UE capability: In this case, independent UE transmit antenna selection configuration may be performed per CG and the UE may perform UE transmit antenna selection within per CG.

(2) A UE is able to support independent UE transmit antenna selection in some cases and the network knows the UE capability: When the UE can supports independent UE transmit antenna selection, independent UE transmit antenna selection configuration may be performed per CG and the UE may perform UE transmit antenna selection within per CG. For other cases, the network may perform one of the followings.

Alt 1: The MeNB may configure UE transmit antenna selection, whereas the SeNB cannot configure separate UE transmit antenna selection. UE transmit antenna selection for SCG may also follow configuration the MeNB if MCG enables UE transmit antenna selection (the same antenna port is used for SCG). If the MeNB determines to allow the SeNB flexibility, the SeNB may configure UE transmit antenna selection. The UE may use the same UE transmit antenna selection for both CGs. In this case, MeNB cannot enable UE transmit antenna selection. In other words, either CG may enable UE transmit antenna selection where the UE applies the same antenna for all carriers based on the latest DCI format 0 from the CG which enabled UE transmit antenna selection.

Alt 2: UE transmit antenna selection may not be used. In other words, if a UE is configured with UE transmit antenna selection, it may be assumed that inter-band CA across CGs is assumed. In other words, if antenna selection is configured, regardless of configuration, a UE may assume that the network can coordinate each other to perform antenna selection. In general, if the network configures inter-site carrier aggregation or dual connectivity, and configure antenna selection at the same time, since a UE does not know whether the network can coordinate each other or not, it may ignore antenna selection. Alternatively, a UE cannot perform independent UE transmit antenna selection. The UE may follow MCG decision and ignore SCG decision. In other words, if there is UE transmit antenna selection configuration from MCG, it may be obeyed. On the other hand, configuration from SCG is either disabled or may not be obeyed if the UE cannot support independent UE transmit antenna selection. More generally, regardless of MCG/SCG, since it may not be known to each other, antenna selection may not be assumed to be enabled when dual connectivity or inter-site carrier aggregation is used.

Alt 3: The MeNB and SeNB may still configure independent UE transmit antenna selection. In this case, a UE may ignore UE transmit antenna selection configuration and UE transmit antenna selection may be up to the UE. Alternatively, a UE may follow only MCG and thus UE transmit antenna selection may be based on the latest DCI format 0 from MCG. Alternatively, a UE may select antenna port based on the latest DCI format 0 from either MCG or SCG depending on the case. If there is any UL transmission to MCG, MCG configuration may be used based on latest DCI format 0 from MCG. Or, if there is no UL transmission to MCG, SCG configuration may be used based on latest DCI format 0 from SCG.

(3) A UE is always able to support independent UE transmit antenna selection and the network does not know the UE capability: Since the network does not know the UE capability, the network may assume that the UE is not able to perform independent UE transmit antenna selection or is able to perform independent UE transmit antenna selection. Depending on the assumption, one of the followings may be considered.

Alt 1: Based on the assumption that the UE cannot perform independent UE transmit antenna selection, the MeNB may configure UE transmit antenna selection, whereas the SeNB cannot configure separate UE transmit antenna selection. UE transmit antenna selection for SCG may also follow configuration of the MeNB if MCG enables UE transmit antenna selection (the same antenna port is used for SCG). If the MeNB determines to allow the SeNB flexibility, the SeNB may configure UE transmit antenna selection. The UE may use the same UE transmit antenna selection for both CGs. In this case, MeNB cannot enable UE transmit antenna selection. In other words, either CG may enable UE transmit antenna selection where the UE applies the same antenna for all carriers based on the latest DCI format 0 from the CG which enabled UE transmit antenna selection.

Alt 2: UE transmit antenna selection may not be used. In other words, if a UE is configured with UE transmit antenna selection, it may be assumed that inter-band CA across CGs is assumed. In case, a UE cannot perform independent UE transmit antenna selection. The UE may follow MCG decision and ignore SCG decision. In other words, if there is UE transmit antenna selection configuration from MCG, it may be obeyed. On the other hand, configuration from SCG is either disabled or may not be obeyed if the UE cannot support independent UE transmit antenna selection.

Alt 3: The MeNB and SeNB may still configure independent UE transmit antenna selection. In this case, a UE may performs independent UE transmit antenna selection per CG (4) A UE is able to support independent UE transmit antenna selection in some cases and the network does not know the UE capability: Since the network does not know the UE capability, the network may assume that the UE is not able to perform independent UE transmit antenna selection or is able to perform independent UE transmit antenna selection. Depending on the assumption, one of the followings may be considered.

Alt 1: Based on the assumption that the UE cannot perform independent UE transmit antenna selection, the MeNB may configure UE transmit antenna selection, whereas the SeNB cannot configure separate UE transmit antenna selection. UE transmit antenna selection for SCG may also follow configuration of the MeNB if MCG enables UE transmit antenna selection (the same antenna port is used for SCG). If the MeNB determines to allow the SeNB flexibility, the SeNB may configure UE transmit antenna selection. The UE may use the same UE transmit antenna selection for both CGs. In this case, MeNB cannot enable UE transmit antenna selection. In other words, either CG may enable UE transmit antenna selection where the UE applies the same antenna for all carriers based on the latest DCI format 0 from the CG which enabled UE transmit antenna selection.

Alt 2: UE transmit antenna selection may not be used. In other words, if a UE is configured with UE transmit antenna selection, it may be assumed that inter-band CA across CGs is assumed. In case, a UE cannot perform independent UE transmit antenna selection. The UE may follow MCG decision and ignore SCG decision. In other words, if there is UE transmit antenna selection configuration from MCG, it may be obeyed. On the other hand, configuration from SCG is either disabled or may not be obeyed if the UE cannot support independent UE transmit antenna selection.

Alt 3: The MeNB and SeNB may still configure independent UE transmit antenna selection. If the UE can support independent UE transmit antenna selection, independent UE transmit antenna selection may be applied. If the UE cannot support independent UE transmit antenna selection, one of the followings, the UE may follow MCG and thus UE transmit antenna selection may be based on the latest DCI format 0 from MCG. Alternatively, the UE may ignore UE transmit antenna selection configuration and UE transmit antenna selection may be up to the UE. Alternatively, the UE may select antenna port based on the latest DCI format 0 from either MCG or SCG. If there is any UL transmission to MCG, MCG configuration may be used based on latest DCI format 0 from MCG. If there is no UL transmission to MCG, SCG configuration may be used based on latest DCI format 0 from SCG. That is, a UE may not follow UE transmit antenna selection from SCG based on its latest DCI format 0, whereas a UE shall follow UE transmit antenna selection from MCG if UE transmit antenna selection is independently enabled by both eNBs. In case that MCG configures UE transmit antenna selection, a UE shall follow UE transmit antenna selection from MCG regardless of UE transmit antenna selection from SCG.

Or, regardless of UE capability on independent UE transmit antenna selection, one of the followings may be applied. That is, the UE may follow MCG and thus UE transmit antenna selection may be based on the latest DCI format 0 from MCG. Alternatively, the UE may ignore UE transmit antenna selection configuration and UE transmit antenna selection may be up to the UE. Alternatively, the UE may select antenna port based on the latest DCI format 0 from either MCG or SCG. If there is any UL transmission to MCG, MCG configuration may be used based on latest DCI format 0 from MCG. If there is no UL transmission to MCG, SCG configuration may be used based on latest DCI format 0 from SCG.

To avoid misalignment between the network and UE in case of (3) and (4) described above, a UE may assume the same antenna for both CGs regardless of configuration. For example, MCG configuration may be used. A higher layer signalling "same_antenna_selection" may be introduced to indicate the same UE transmit antenna selection mechanism between two CGs. A UE may follow UE transmit antenna selection from any CG where the configuration on UE transmit antenna selection is given (e.g., if MCG configures UE transmit antenna selection, follows MCG decision, otherwise if SCG configures UE transmit antenna selection, follows SCG decision).

In the description above, it is assumed that a UE can support UE transmit antenna selection for the target frequencies where dual connectivity is configured. Otherwise, the network cannot configure any UE transmit antenna selection.

FIG. 6 shows an example of a method for configuring UE transmit antenna selection according to an embodiment of the present invention. In step S100, the UE receives a configuration of UE transmit antenna selection from a network. The configuration of UE transmit antenna selection may be received via higher layer. In step S110, the UE determines whether to apply the configuration of UE transmit antenna selection according to a configuration of dual connectivity. It may be determined to apply the configuration UE transmit antenna selection when the configuration of dual connectivity is not received from the network. In this case, the UE may perform UE transmit antenna selection. Alternatively, it may not be determined to apply the configuration UE transmit antenna selection when the configuration of dual connectivity is received from the network. In this case, the UE may perform transmission by using antenna port 0. The UE may be configured with both a MCG and SCG.

According to an embodiment of the present invention, UE transmit antenna selection is configured by higher layers via parameter ue-TransmitAntennaSelection. A UE configured with transmit antenna selection for a serving cell is not expected to
- be configured with more than one antenna port for any UL physical channel or signal for any configured serving cell, or
- be configured with trigger type 1 sounding reference signal (SRS) transmission on any configured serving cell, or
- be configured with simultaneous PUCCH and PUSCH transmission, or
- be configured with demodulation reference signal for PUSCH with orthogonal cover code (OCC) for any configured serving cell, or
- receive DCI Format 0 indicating UL resource allocation type 1 for any serving cell, or
- be configured with a SCG.

If UE transmit antenna selection is disabled or not supported by the UE, the UE shall transmit from UE port 0. If closed-loop UE transmit antenna selection is enabled by higher layers the UE shall perform transmit antenna selection for PUSCH in response to the most recent command received via DCI Format 0. If a UE is configured with more than one serving cell, the UE may assume the same transmit antenna port value is indicated in each PDCCH/EPDCCH with DCI format 0 in a given subframe. If open-loop UE transmit antenna selection is enabled by higher layers, the transmit antenna for PUSCH/SRS to be selected by the UE is not specified.

FIG. 7 shows a wireless communication system to implement an embodiment of the present invention.

An eNB 800 may include a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 may include a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for operating a user equipment (UE) in a wireless communication system, the method comprising:
   receiving, by the UE, information on a UE transmit antenna selection from a network;
   receiving, by the UE, information on a dual connectivity (DC) from the network,
   wherein the UE is configured with both a master cell group (MCG) and a secondary cell group (SCG) in the DC based on the information on the DC; and
   based on the information on the DC, determining, by the UE, not to apply the information on the UE transmit antenna selection, and instead performing a transmission based on antenna port 0.

2. The method of claim 1, wherein the information on the UE transmit antenna selection is received from the network via a higher layer.

3. A user equipment (UE) comprising:
   a memory;
   a transceiver; and
   a processor coupled to the memory and the transceiver, and configured to:
   control the transceiver to receive information on a UE transmit antenna selection from a network;
   control the transceiver to receive information on a dual connectivity (DC) from the network,
   wherein the UE is configured with both a master cell group (MCG) and a secondary cell group (SCG) in the DC based on the information on the DC; and
   based on the information on the DC, determine not to apply the information on the UE transmit antenna selection, and instead control the transceiver to perform a transmission based on antenna port 0.

4. The UE of claim 3, wherein the information on the UE transmit antenna selection is received from the network via a higher layer.

* * * * *